United States Patent [19]

Richards

[11] Patent Number: 5,003,473
[45] Date of Patent: Mar. 26, 1991

[54] TRADING TICKET OUTPUT SYSTEM

[75] Inventor: J. M. Richards, Blewburyt Didcot, England

[73] Assignee: Reuters Limited, England

[21] Appl. No.: 261,787

[22] Filed: Oct. 24, 1988

[51] Int. Cl.$^5$ .................................... G06K 15/00
[52] U.S. Cl. ................................ 364/408; 364/900
[58] Field of Search ................. 364/408, 200, 900; 320/90, 91

[56] References Cited

U.S. PATENT DOCUMENTS

| 4,745,559 | 5/1988 | Willis et al. | 364/408 |
| 4,750,135 | 6/1988 | Boilen | 364/514 |

Primary Examiner—Jerry Smith
Assistant Examiner—Kimthanh T. Bui
Attorney, Agent, or Firm—Bryan, Cave, McPheeters & McRoberts

[57] ABSTRACT

A trading ticket output communication system for communicating trading ticket output information (812) relating to a plurality of different type confirmed trading transaction (806, 810) from one or more uniquely identifiable local ticket data bases (814, 416) at which the trading ticket output information is initially collected (816) to a remote back office data base (401) is disclosed in which trading tickets may be requested from a local data base (814, 416) in order of confirmation of trading transaction independent of the type of trading transaction involved. The invention is described, by way of example, with respect to the money market in which the various types of trading transactions comprise single deals, such as spot or outright deals, swap deals, and deposit deals. The local data base (814,416) also stores a status record corresponding to the trading ticket record content of the local data base (814,416), which record changes with each change in the number of confirmed trading transaction records at the local data base (814, 416). The status record at the local data base (814,416) is used as a source of information with respect to the occurrence of additional trading transactions so that the remote data base (401) may be advised of the presence of additonal trading tickets at the various local data bases (814,416) without the need for continual polling.

14 Claims, 9 Drawing Sheets

TICKET REQUEST
TO DATA BASE SERVER 416
(SNAPSHOT REQUEST)
(FS) 333(US)(Tag)(GS)(Alpha_Name)(FS)

*FIG. 9*

RECORD RESPONSE TO BACK OFFICE COMPUTER-401
(FS) 340(US)(Tag)(GS)(Alpha_Name)
(US)(Field_List_No)(US)(RTL)
I {(RS)(Field_ID)(US)(Field_Value)} n(FS)

*FIG. 10*

STATUS REQUEST TO
DATA BASE SERVER 416
(DATA AND UPDATES REQUEST)
(FS) 332(US)(Tag)(GS)(Alpha_Name)(FS)

*FIG. 11*

REPLY TO STATUS REQUEST-SENT TO
BACK OFFICE COMPUTER 401

(FS) 340 (US) (Tag)
(GS)AAAA II INFO (US)(Field List No.)(US)(RTL)
I {(RS)(Field_ID)(US)(Field_Value)} n(FS)

*FIG. 12*

TRADING TICKET OUTPUT SYSTEM

CROSS-REFERENCE TO RELATED APPLICATIONS

This application is related to commonly-owned U.S Pat. No. 4,745,559, entitled "Method and System for Dynamically Controlling the Content of a Local Receiver Data-base from a Transmitted Data-base in an Information Retrieval Communication Network", issued May 17, 1988, and naming Richard A Willis, Alan Markham, and Robert S. Genshaft as joint inventors thereof; and the co-pending U.S Patent Application entitled "Conversation Analyzing Video Trading System", filed Oct. 24, 1988, and naming Christopher J. Ordish and John M. Richards as joint inventors thereof, the contents of both of which are specifically incorporated by reference herein in their entirety

TECHNICAL FIELD

The present invention relates to trading ticket output systems for use with high performance, information retrieval systems for financial information, and particularly to such systems for providing high speed reliability and timely reporting of trading information without continuous polling.

BACKGROUND ART

Information retrieval systems for financial information, such as stock market type information and money market information, normally employ a transfer of data in a high performance, real time information retrieval network in which update rates, retrieval rates and subscriber or user population are generally very high. An example of such a system is the "REUTERS DEALING SERVICE" which is used in the foreign exchange or money market. Such systems, while providing rapid video conversation capability, still require a permanent back office record of the trading transactions between dealers. This record is normally referred to as the trading ticket and is a permanent confirmation of the deal, with this information normally being stored in the back office computer at the user's site. The back office computer normally monitors all of the financial or money market trading at a given site in such a system and, in accordance with this function, rapid collection of this information in the high performance, real time information environment of modern financial trading is desirable. Thus, high speed reliable systems that can provide this information to the back office computer without continual polling of the various keystations can significantly improve the high speed reporting and data collection capabilities of the back office computer. Commonly owned U.S. Pat. No. 4,745,559 describes methods and systems for dynamically controlling the content of a local receiver data base from a transmitted data base in an information retrieval communication network, such as an information retrieval system capable of supporting the transfer of data on a high performance, real time information retrieval basis in which update rates, retrieval rates and subscriber population are high, and refers to the adaptability of such a system to the collection of financial information, such as stock market type information and money market information. The logical data structures and protocols described therein are beneficial and overcome many of the earlier problems of the prior art, such as the various problems present in the type of systems described in U.S. Pat. Nos. 4,260,854; 4,633,397; and Japanese Patent Nos. 59-89056 and 60-144050. However, none of these prior art systems known to the applicant disclose a high speed, reliable system for providing trading ticket information to a back office computer without continual polling, such as through the use of status records, as in the present invention, or the ability to have deal tickets requested in order without concern as to the type of the deal. The aforementioned commonly owned co-pending U.S. Patent application entitled "Conversation Analyzing Video Trading System", incorporated by reference herein, among other things describes a system for automatically generating trading tickets rapidly by using conversation analysis With such rapid real time generation of trading tickets, it is important that there be a high speed reliable system that can provide information about these trading tickets to the back office computer without continual polling or certain of the benefits and efficiencies of the aforementioned rapid trading ticket generation could be lost in considering the overall efficiencies of the system. These disadvantages of the prior art are overcome by the present invention.

DISCLOSURE OF THE INVENTION

A trading ticket output communication system for communicating trading ticket output information relating to a plurality of different type confirmed trading transactions from one or more uniquely identifiable local ticket data bases at which the trading ticket output information is initially collected to a remote back office data base is disclosed in which trading tickets may be requested from a local data base in order of confirmation of trading transaction independent of the type of trading transaction involved. The invention is described, by way of example, with respect to the money market in which the various types of trading transactions comprise single deals, such as spot or outright deals, swap deals, and deposit deals. Each of these types of deals has an associated field list which uniquely defines the transmission format of the information although the request for the information is by a unique ticket identifier which is independent of the type of trading transaction and comprises the unique identification of the local data base, which is the associated terminal controller and the sequential number corresponding to the order of confirmation of each of the trading transaction at the particular local data base. The local data base also stores a status record corresponding to the trading ticket record content of the local data base, which record changes with each change in the number of confirmed trading transaction records at the local data base. By requesting this status record with automatic updates, the remote back office computer can be advised that additional confirmed trading transactions have occurred and can request updates without the need for continual polling.

BRIEF DESCRIPTION OF DRAWINGS

FIG. 9 is a diagrammatic representation of a typical snapshot ticket request to the data base server from the back office computer in accordance with the present invention;

FIG. 10 is a diagrammatic illustration, similar to FIG. 9, of a typical record response to the back office computer from the data base server in response to the ticket request of FIG. 9;

FIG. 11 is a diagrammatic illustration, similar to FIG. 9, of a data and updates status request to the data base server from the back office computer in accordance with the present invention; and FIG. 12 is a diagrammatic illustration, similar to FIG. 10, of a reply to the status request of FIG. 11 which is sent to the back office computer in accordance with the present invention.

BEST MODE FOR CARRYING OUT THE INVENTION

Figure 1:
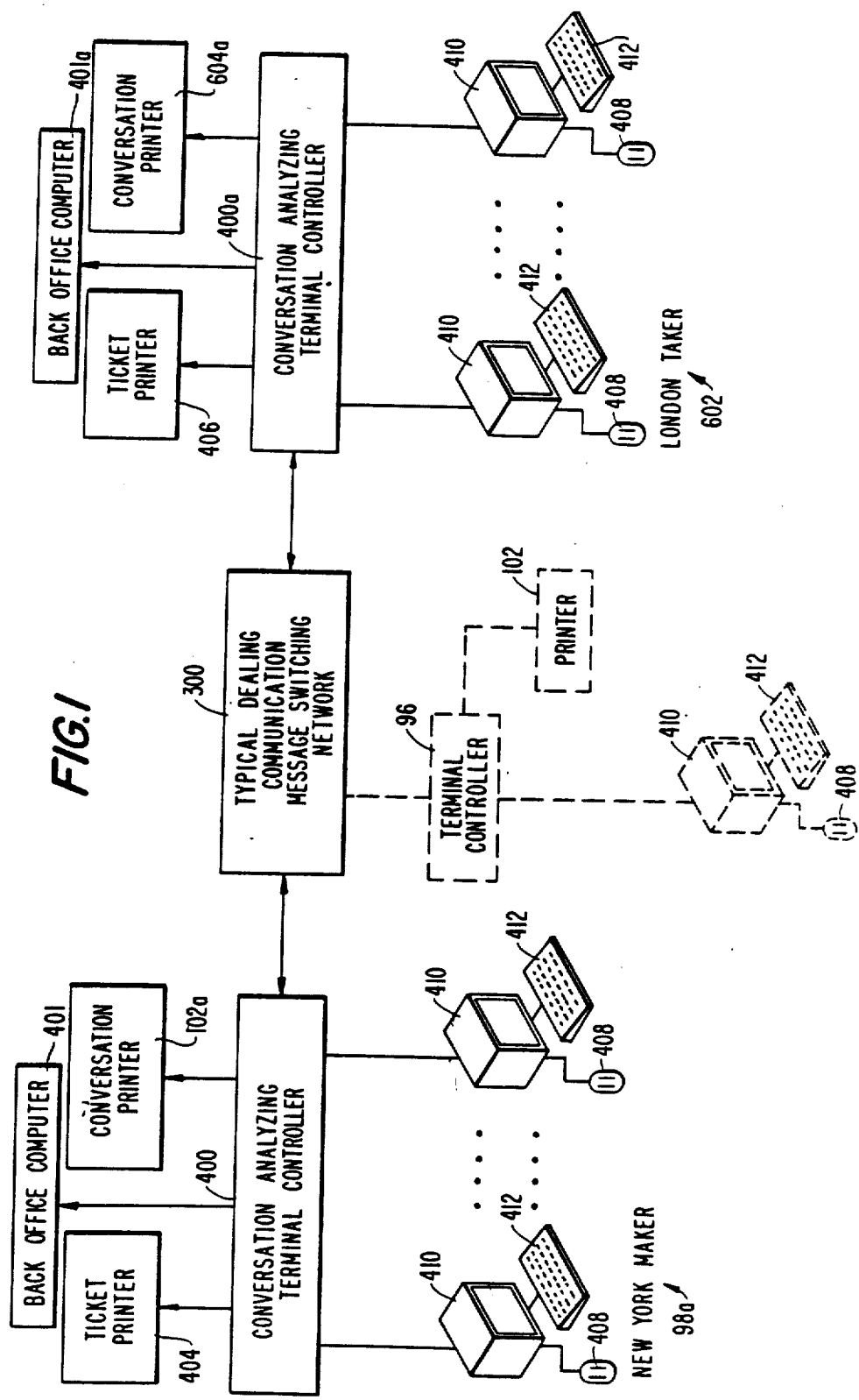
FIG. 1 is an overall system functional block diagram of the conversational video system described in the aforementioned commonly owned co-pending U.S. Patent Application entitled "Conversation Analyzing Video Trading System" incorporated by reference herein, modified, however, to employ the trading ticket output system of the present invention.
Figure 2:
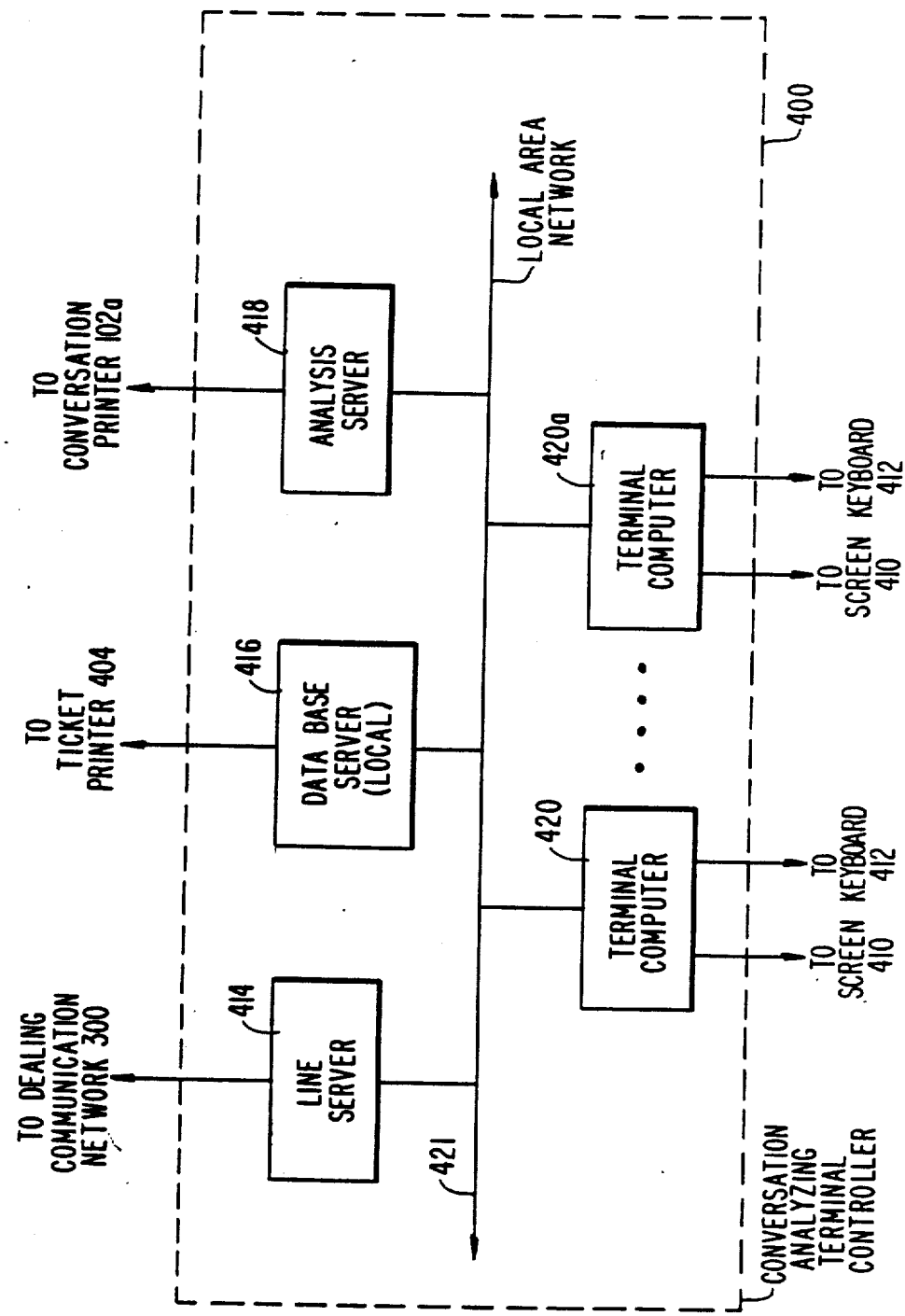
FIG. 2 is a functional block diagram of a typical conversation analyzing terminal controller usable in the system of FIG. 1, containing a data base server capable of communicating with a back office computer in accordance with the trading ticket output system of the present invention.
Figure 3:
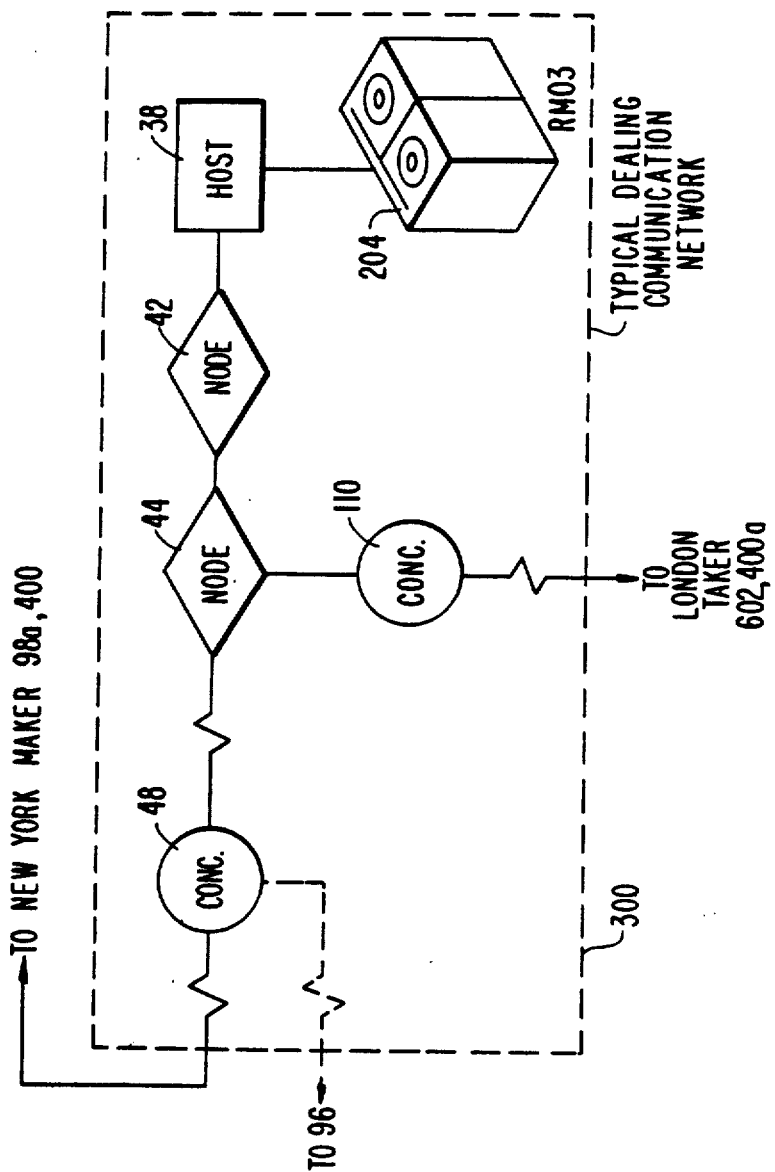
FIG. 3 is a functional block diagram of a typical foreign exchange dealing communication network, such as the communication network disclosed in commonly owned U.S. Pat. No. 4,525,779, usable in the system of FIG. 1.

Referring now to the drawing in detail, and initially to FIGS. 1–3, the overall conversational video system described in my commonly-owned copending U.S. patent application entitled "Conversation Analyzing Video Trading System", the contents of which is incorporated by reference herein, is shown. However, the system of FIGS. 1–3 has preferably been modified to illustrate a back office computer 401, 401a, such as a conventional computer capable of communicating with the data base server 416 comprising a part of the conversational analyzing terminal controller 400, 400a. For sake of clarity, the same reference numerals have been employed herein for like functioning components of FIGS. 1–3, which are common to FIGS. 1–3 of the aforementioned copending patent application. As was explained, therein, the system of FIGS. 1–3 employs real time conversation analysis to, among other things, enable the preparation of dealing tickets in real time while the deal is being arranged through the use of what are commonly called artificial intelligence techniques to analyze the dealing dialogue and generate the ticket.

Thus, the system of FIGS. 1–3 is what is commonly termed an expert type of system. Of course, although the system is described by way of example with respect to foreign exchange dealing, it may be used in connection with any type of high performance system in which trading tickets are generated. As was also explained in the aforementioned copending patent application, the system of FIGS. 1–3 can also be used for data capture of offline deals as well, which offline deals also result in the creation of tickets usable with the trading ticket output system of the present invention. Thus, the system of the present invention is not concerned with whether the input was due to an online deal or an offline deal as long as the trading ticket information has been provided to the data base server 416.

Apart from the conversation analysis function and the analysis driven ticket generation and associated features described in the aforementioned copending patent application, and the trading ticket output system of the present invention, the present system is substantially similar to other conversational video systems developed by applicant's assignee and described in commonly-owned U.S. Pat. Nos. 4,525,779; 4,388,489; 4,531,184; and the commonly-owned contemporaneously-filed U.S. patent application entitled "Fast Contact Conversational Video System", although the present invention need not be limited to a conversational video system as long as there is a local data base record of trading tickets for communication to a back office data base. For purposes of completeness, before describing the trading ticket output system of the present invention with reference to FIGS. 4–11, I shall briefly describe the system of FIGS. 1–3 so that it can be understood within the context of the present invention.

As shown in FIG. 1, by way of example, which is a functional block diagram of the overall system of the present invention, the block labeled "Typical Dealing Communication Network", generally referred to by reference numeral 300, and illustrated in greater detail in FIG. 3, is basically the same type of communication network as illustrated in FIG. 13J, by way of example, of U.S. Pat. No. 4,525,779 and the same reference numerals have been used in FIG. 3 as are used in U.S. Pat. No. 4,525,779 for like functioning components such as for the concentrators 48 and 110, for the nodes 44 and 42, for the host computer 38, and for the storage device 204. Of course, other packet switching communication networks could be employed, if desired, in place of network 300. By way of comparison of the overall system functional block diagram of FIG. 1 with that of FIG. 13J of U.S. Pat. No. 4,525,779, by way of example, it can be seen that the terminal controller 96, shown in FIG. 13J of U.S. Pat. No. 4,525,779 is preferably replaced by the conversation analyzing terminal controller 400 or 400a of the present invention which enables real time conversation analysis of the video conversations between, for example, a New York Maker 98a and a London Taker 602 and the provision of real time automatic generation of tickets based on such conversation. In addition to the conversation printer, such as printer 102, 102a, and 604a, there are preferably ticket printers 404, 406, by way of example, which enable the printing of dealing tickets based on the aforementioned real time conversation analysis, as will be described in greater detail hereinafter. In addition, the user terminals or keystations illustrated in FIG. 1 are shown as also having a conventional mouse 408, such as the mouse described in the aforementioned "Fast Contact Conversational Video System" patent application incorporated by reference herein, such as for providing the fast contact feature disclosed therein. Of course, if desired, the mouse 408 may be omitted. Moreover, as shown by way of example in FIG. 1, both parties to a conversation need not have a conversation analyzing terminal controller, such as 400 or 400a and one of the parties may have a terminal controller such as the type of controller 96, by way of example, described in U.S. Pat. No. 4,525,779, in which instance that party will not have the benefit of real time conversation analysis to provide, for example, context sensitive or analysis driven prompts, or automatic ticket generation, or inconsistency notification, based on such real time conversation analysis. If that party wished those benefits, then a conversation analyzing terminal controller such as controller 400 would preferably be employed in place of the previous terminal controller 96. The data display terminals or video monitors or screens 410 illustrated in FIG. 1, which are conventional video monitors, having associated keyboards 412, provide the appropriate screen displays of the video conversations as well as the trading ticket being generated, such as described in the aforementioned copending patent application.

The presently preferred conversation analyzing terminal controller 400 or 400a is illustrated by way of example in FIG. 2. As shown and preferred in FIG. 2, the conversation analyzing terminal controller 400, 400a, of the present invention preferably includes a line server 414, a local data base server 416 which communicates with the back office computer 401 such as to provide a record of the tickets generated by the keystations associated with the terminal controller 400, and a conversation analysis server 418, all of which are preferably 80386 computers, such as COMPAQ 80386 based computers. In addition, as also shown and preferred in FIG. 2, the conversation analyzing terminal controller 400, which can preferably serve a plurality of terminals, such as up to 12, by way of example, includes an 80386 based terminal computer 420, 420a, for each keystation associated with the conversation analyzing terminal controller 400, with one output to the screen or video display 410 and the other output to the keyboard 412 from the terminal computer 420, 420a. The various computers 414, 416, 418, 420 and 420a are preferably tied together in a conventional local area network 421 so as to permit communication between appropriate ones of the various computers 414, 416, 418, 420, 420a in accomplishing the conversation analysis, context sensitive prompts, inconsistency alert, and automatic ticket generation functions of the present invention, with the data base server 416 preferably being tied to the back office computer 401. The line server 414 preferably serves as an interface between the terminal computers 420, 420a and the appropriate concentrator 48 or 110, in the communication network 300. The data base server 416 preferably stores conversations and completed Dealing tickets and provides this information to the ticket printer 404 or 406 and to the conversation printer 102a or 604a, as well as to the back office computer 401, in accordance with the present invention. The conversation analysis server 418 preferably stores the conversation analysis software, such as the software of Table B annexed to the aforementioned copending U.S. patent application incorporated by reference herein. The analysis server 418 preferably analyzes the conversation in real time and provides appropriate context sensitive or analysis driven prompts to the Maker or Taker's screen, depending on whom the conversation analyzing terminal controller 400 or 400a is associated with at the time, provides Dealing tickets to the data base server 416 associated with it, and alerts the user to inconsistencies in the conversation by providing such alerts to the screen 410.

The conversation analysis software, which is contained by way of example in Table B annexed to the aforementioned copending U.S. patent application, and the context sensitive prompt or prompt menu selecting software which is contained in Table A, also annexed thereto, are preferably written in C language for use with an 80386 computer, with the communication itself between two counterparties being referred to herein as a conversation. Preferably, this system is employed in connection with foreign exchange trading, although, as previously mentioned, it is not so limited. Although in the example of FIG. 2, three separate servers 414, 416 and 418 are shown, these servers can be combined into a single computer, if desired, with each keystation still being supported by a dedicated terminal computer 420, 420a, and with, as previously mentioned, these keystation computers 420, 420a being linked to the servers 414, 416 and 418 by a conventional local area network 421. Preferably, communication over the local area network 421 uses a virtual connection such as provided by the MS-NET standard variant. In addition, preferably, all of the data about each conversation in progress, such as up to 24 such conversations for a given conversation analyzing terminal controller 400 by way of example, is held in a global array with each element in this array pointing to a structure of type CONVDATA in accordance with the software given by way of example in the aforementioned Table B. This is a type which holds the various network handles associated with the conversation, the text buffer for the conversation, and so on. It also preferably includes an element identified as SAVEDDATA of type ANALYSISDATA, which is used to store the state of the conversation analysis. The conversation analysis is driven by the receipt of packets of text from the various keystations. These successive chunks of text arrive in ANALYZE TEXT PACKETS which are directed to the correct procedure by the environment, which has been informed of the destination of the input messages by a call to NetRegisterReply in the procedure Ov-main in section caserver.c in the aforementioned software of Table B.

The incoming packets of text are directed to the procedure fn ReplyAnalysisMessages in the section camesage.c. When an ANALYSE TEXT packet is received for a conversation, (Current Conv) is set to point to the CONVDATA structure for the appropriate conversation, and the saved analysis state and ticket are preferably copied into the working areas pointed to by the globals (Ticket) and (Analysis Data). Then the procedure ReplyAnalyseText in the section camesage.c of the aforementioned Table B is called to check the request. If appropriate, the analysis is initialized. This happens when text is deleted, for example, by an interrupt. When new text is added to the conversation, the C library procedure setjump of Table B is called to store the current C context for the longjump return from parsing described in my copending U.S. patent application incorporated by reference herein. This call to setjump returns to zero, and then the parsing routine parse of Table B is preferably called to analyze the conversation from the last saved state. When the parsing is terminated by reaching the end of the text currently held, the longjump call returns to the point at which setjump was called with a non zero reply, and the analysis is wrapped up by notifying the keystation of any change to the analysis. Preferably, the conversation analysis, exemplified by Table B, always starts on the parse procedure. In the aforementioned parse procedure, if no previous conversation analysis has been done, the analysis state is initialized.

Preferably, there is then a check to see if the type of deal is known since the system is capable of analyzing a plurality of different types of deals, such as, by way of example, a spot deal, an outright deal, a swap/forward deal, and a deposit deal. A spot deal as used herein is one in which one party buys a specified amount of currency X from the other party, paying him in currency Y at a specified exchange rate, with the deal taking place on the spot date. A spot date is normally two working days time, but could be today or tomorrow. An outright deal as used herein is one which is similar to a spot deal except that the deal takes place on a specified future date. Future dates are either standard dates, which can be determined from a conventional statement, such as "3 months", or specific dates, which are known as broken dates. A swap/forward deal as used herein is one which is equivalent to a spot deal plus a subsequent outright deal the other way around for the same amount, or to two outright deals for the same amount, different ways around, but on different dates. For example, dealer A may agree to buy one million dollars worth of francs from dealer B on the spot date and three months later sell him back one million dollars worth of francs. The number of francs involved will normally be different in the two deals because the rates will be different. In the normal forward deal as used herein, the first of the two transactions will be at spot. A forward/-forward deal as used herein is when both transactions are for forward dates. An overnight deal as used herein has one transaction today and the second on the next trading day. A tomorrow/next deal as used herein has the first transaction on the next trading day. Lastly, a deposit deal as used herein is one in which one party deposits a specified amount of a specified currency with the other party for a specified period at a specified interest rate.

If the type of deal is not known, the conversation is preferably parsed until the type of deal can be deduced. Once the type of deal is known, the information extracted during the parse is preferably pruned of data incompatible with the type of deal, and then the conversation is preferably reexamined by a parsing procedure that assumes that the type of deal has been determined. The deal specific parsing is then preferably expected to continue as long as the conversation runs; however, that deal assumption may be contradicted by a clear indication that the conversation is about a different type of deal. In such a case, the information extracted is preferably again pruned to correspond to the new type of deal and then further parsing is done assuming the new type of deal. However, in this instance the parse does not restart from the beginning of the conversation but continues from the current point.

As was previously mentioned, tickets are preferably created in the system of the present invention as the system extracts information by analyzing conversations, with the display of the ticket being generated appearing on the screen 410. Preferably, only one analysis can be associated with one conversation and, after a user confirms the analysis of the current conversation, a ticket can be printed on the ticket printer 404 or 406 depending on whether it is the Market Maker or the Market Taker, respectively, when the conversation is next terminated or printed and is stored in the data base server 416. Preferably, the ticket printer 404, 406 is a separate printer with the same characteristics as the conversation printer 102a, 604a; namely, it accepts serial data and it prints on continuous paper. As a conversation takes place, the associated conversation analysis area on the screen 410 preferably shows a summary of the analysis information, which, if desired, can become a fully expanded version of the current analysis which is then displayed on the screen 410. When the conversation is terminated and saved, preferably the analysis is saved with it. Preferably, in the system of the present invention, conversations and analyses are saved and deleted only as more storage is required.

Before a conversation analysis can be confirmed in the system of the present invention, preferably it must contain at least the following information about the deal: the deal type, the deal direction, the currency or currencies, the amount, the rate or rates, and the value date. Thereafter, the user can confirm the conversation analysis by pressing the CONFIRM key. Preferably, once an analysis has been set into the confirming mode, the next time the conversation is ended on the dealer's screen 410, a ticket is printed and stored on the data base server 416. Thereafter, the conversation cannot be edited any further. Preferably, in the system of the present invention, a confirmed analysis cannot be marked as cancelled or wrong and, therefore, the only way to cancel the effect of a confirmed deal is to enter a compensating deal by an offline conversation. If the analysis has not been confirmed, it can then be marked as cancelled or wrong at any time during a real or offline conversation or when wrapping up a conversation by pressing the CANCEL or WRONG keys. An analysis marked as cancelled can be changed to wrong and vice versa, and an analysis marked as cancelled or wrong can be confirmed. As was previously mentioned, in the preferred system of the present invention, the way to generate a ticket on the ticket printer 404, 406, is by setting the conversation being analyzed to the CONFIRMING state which ends the analysis.

It should be noted that in the system of the present invention, the conversation summary analysis which ultimately results in the generated ticket is updated during the course of the dialogue or conversation and provides additional visual feedback to the dealer. The conversation summary analysis on the screen 410 preferably contains or displays information such as the type of deal, the analysis status, the period, the volume and volume currency, the rates and currencies involved, the value dates, and whether all payment instructions on each side have been entered. If this analysis finds inconsistent data, as previously mentioned, the fields concerned in this display are preferably highlighted to alert the user.

With respect to the analysis status, there are preferably seven areas of analysis which are preferably indicated in the display area. These various analysis status indications are NO DEAL where the system does not think there has been a deal, INCOMPLETE where the system thinks there has been a deal but has not been able to extract all the details needed for the analysis to be confirmed, EXTRACTED where the system thinks there has been a deal and has extracted sufficient details needed for the analysis to be confirmed, CONFIRM- ING where the dealer has confirmed the analysis but the conversation has not been ended or printed, CONFIRMED where the dealer has confirmed the analysis and the relevant part of the conversation has been ended and sent for printing, CANCELLED where the dealer has marked the analysis as cancelled, and WRONG where the dealer has marked the analysis as wrong. When a conversation starts the status is NO DEAL with the subsequent events causing it to change. Thus the status changes from NO DEAL to INCOMPLETE when the conversation analysis finds a line which it understands as a deal, such as a line which specifies an amount if being bought or sold. The analysis status then changes from INCOMPLETE to EXTRACTED when the conversation analysis finds the last piece of information it needs to allow the analysis to be confirmed. The analysis then changes from EXTRACTED, CANCELLED, or WRONG, to CONFIRMING, when the dealer has pressed CONFIRMED and the analysis has sufficient relevant information for the deal to be confirmed. The analysis status changes from CONFIRMING to CONFIRMED when the dealer terminates the conversation or presses the PRINT key. The analysis status changes from EXTRACTED to INCOMPLETE or NO DEAL when the system receives information from the counterparty indicating that some of the relevant text has not been received or has been backed out by an interrupt, which is normally indicated to the dealer as an interrupt or as a fault in the conversation. In order to change the analysis status to CANCELLED, the dealer presses the CANCELLED key from any status except CONFIRMED. This is also true with respect to changing the analysis status to WRONG. This is accomplished by the dealer pressing the WRONG key from any status, except CONFIRMED, to WRONG.

In the system of the present invention, pressing the TICKET key causes the expanded analysis display mode to be entered or stored in the data base server 416. As was previously mentioned, in this mode, the expanded analysis for the current conversation is displayed on the screen 410. The expanded analysis preferably shows the full contents of all the fields that can appear in the analysis except that payment instructions may, if necessary, be truncated. In the case of forward deals, preferably the information for both value dates is shown, requiring four transactions. While in expanded analysis display mode, the expanded analysis on display is preferably kept up-to-date with the conversation. Swapping between two conversations would automatically preferably swap between the two expanded analyses so that the one for the current conversation was always visible. The expanded analysis display mode preferably remains in effect until a different use of this display area is requested. Preferably, if a printout of the conversation analysis is requested, the output on the conversation printer 102a, 604a is similar to that of the displayed window, although the payment instructions may be moved to a separate line if desired. With respect to printing a ticket with the ticket printer 404, 406, the format of the ticket is preferably similar to the expanded analysis, however the order of the information may be changed to present the more critical information first. Of course, although the creation and storage of a ticket has been described in terms of the real time conversation analysis system of my aforementioned copending patent application, such a system is not necessary for the present invention, which merely requires a local data base storage of trading tickets no matter how these trading tickets are dynamically created.

Now referring to FIGS. 4–11, the preferred trading ticket output system of the present invention employing the presently preferred ticket output protocol and process shall be described for handling the transfer of trading ticket information between the local data base server 416 and the back office computer 401. In this regard, with reference to U.S. Pat. No. 4,745,559, the local data base server 416 of the present invention is analgous to the local data base described in U.S. Pat. No. 4,745,559, except, as will be described in greater detail hereinafter, there are various differences as it relates to the presently preferred ticket output protocol and process of the present invention. Although, the preferred ticket output protocol of the present invention preferably employs field identifiers or FIDs which are analgous to the field identifiers referred to in the aforementioned U.S. Pat. No. 4,745,559, the information contained therein is totally different. In place of the record identifier codes or RICs referred to in the aforementioned U.S. Pat. No. 4,745,559, the ticket output protocol process of the present invention preferably employs unique deal identifiers which correspond to the ticket number on the printed deal ticket as well as to the conversation analyzing terminal controller 400 which contains the local data base server 416 containing that record. Thus, the deal or trading ticket identifier includes the terminal controller identifier as well as a ticket number, with deals preferably being given sequential numbers in order of their confirmation. The sequence is preferably in the range of 1–999999, by way of example for each terminal controller 400. The deal identifier preferably starts with the terminal controller identifier and a # and is followed by the sequential number, such as, for example, AAAA#123456 for deal number 123456 on terminal controller AAAA. In addition to retrieving the deal per se, the status of the data in the terminal controller system can also preferably be retrieved using the terminal controller identifier AAAA#INFO, by way of example.

Preferably, as will be described in greater detail hereinafter, the data base server 416 can supply two kinds of data to be retrieved about the deals being conducted by the keystations associated with that terminal controller 400; namely information on a deal, and status information on what is stored in the data base. As will be described in greater detail hereinafter, it is the updates from the status record which are preferably looked at to see if there is a change in status indicating that a new trade has arrived, which permits rapid transfer of trading information, such as the trading tickets, without the need for continuous polling of the various terminal controllers 400, 400a. It should be noted that each terminal controller 400, 400a keeps it's own unique record of deals and has it's own unique set of deal identifiers which are independent of the other terminal controllers 400, 400a associated with the back office computer 401, assuming more than one terminal controller is associated therewith, since a portion of the record identifier is the unique identification of the terminal controller 400, 400a itself. A data record associated with a terminal controller identifier or TCID, is preferably a collection of data items with each data item being assigned a unique Field Identifier Number or FID. The presently preferred ticket output protocol preferably uses the FID number to identify each data item within a message. Preferably, records in the system are grouped into classes, such as for a deposit deal, or a swap deal or a single deal, such as a spot or outright deal, with each class preferably relating to a set of FIDs called a Field List. The Field List is analagous to a template except that it relates to the format of the transmission of the data as opposed to the display per se, with the Field List defining which collection of data items will be received for that class of record. This Field List is preferably contained in the record response of the data base server 416 to the request of the back office computer 401 for trading ticket information, such as illustrated in FIG. 10 by way of example.

Since single deals such as spot or outright deals; swap deals; and deposit deals have certain characteristics unique from each other, unique field identifiers must preferably be provided to distinguish these type of deals in the preferred ticket output protocol of the present invention. An example of these unique field identifiers with respect to spot and forward and outright deals is shown below in Table A.

TABLE A

| Field List Name: | | SINGLE DEAL | |
| Field List Number: | | 501 | |
| ACRONYM | FID | FIELD TYPE | LENGTH |
| --- | --- | --- | --- |
| SOURCE | 500 | ENUMERATED | 1 |
| REFERENCE | 501 | ALPHANUMERIC | 8 |
| DEAL_DATE | 502 | DATE | 11 |
| DEAL_TIME | 503 | TIME | 8 |
| DEALER_ID | 504 | ALPHANUMERIC | 6 |
| CONFIRM_DATE | 505 | DATE | 11 |
| CONFIRM_TIME | 506 | TIME | 8 |
| CONFIRM_ID | 507 | ALPHANUMERIC | 6 |
| BANK_CODE 1 | 508 | ALPHANUMERIC | 4 |
| BANK_NAME 1 | 509 | ALPHANUMERIC | 56 |
| BROKER_CODE | 510 | ALPHANUMERIC | 4 |
| BROKER_NAME | 511 | ALPHANUMERIC | 56 |
| BANK_NAME 2 | 513 | ALPHANUMERIC | 56 |
| DEAL_TYPE | 514 | ENUMERATED | 1 |
| PERIOD_1 | 515 | ENUMERATED | 3 |
| CURRENCY_1 | 517 | ALPHANUMERIC | 3 |
| CURRENCY_2 | 518 | ALPHANUMERIC | 3 |
| VOLUME_1 | 519 | INTEGER | 15 |
| EXCH_RATE 1 | 522 | PRICE | 12 |
| DIRECTION | 524 | ENUMERATED | 1 |
| VALUE_DATE_1 | 525 | DATE | 11 |
| VALUE_DATE_2 | 526 | DATE | 11 |
| PAYMENT_1 | 529 | ALPHANUMERIC | 56 |
| PAYMENT_2 | 530 | ALPHANUMERIC | 56 |

These unique field identifiers as they relate to swap deals is shown below by way of example in Table B.

TABLE B

| Field List Name: | | SWAP_DEAL | |
| Field List Number: | | 502 | |
| ACRONYM | FID | FIELD TYPE | LENGTH |
| --- | --- | --- | --- |
| SOURCE | 500 | ENUMERATED | 1 |
| REFERENCE | 501 | ALPHANUMERIC | 8 |
| DEAL_DATE | 502 | DATE | 11 |
| DEAL_TIME | 503 | TIME | 8 |
| DEALER_ID | 504 | ALPHANUMERIC | 6 |
| CONFIRM_DATE | 505 | DATE | 11 |
| CONFIRM_TIME | 506 | TIME | 8 |
| CONFIRM_ID | 507 | ALPHANUMERIC | 6 |
| BANK_CODE_1 | 508 | ALPHANUMERIC | 4 |
| BANK_NAME_1 | 509 | ALPHANUMERIC | 56 |
| BROKER_CODE | 510 | ALPHANUMERIC | 4 |
| BROKER_NAME | 511 | ALPHANUMERIC | 56 |
| BROKER_NAME_2 | 513 | ALPHANUMERIC | 56 |
| DEAL_TYPE | 514 | ENUMERATED | 1 |
| PERIOD_1 | 515 | ENUMERATED | 3 |
| PERIOD_2 | 516 | ENUMERATED | 3 |
| CURRENCY_1 | 517 | ALPHANUMERIC | 3 |
| CURRENCY_2 | 518 | ALPHANUMERIC | 3 |
| VOLUME_1 | 519 | INTEGER | 15 |
| SWAP_RATE | 521 | ALPHANUMERIC | 12 |

TABLE B-continued

| Field List Name: | | SWAP_DEAL | |
| Field List Number: | | 502 | |
| ACRONYM | FID | FIELD TYPE | LENGTH |
| --- | --- | --- | --- |
| EXCH_RATE 1 | 522 | PRICE | 12 |
| EXCH_RATE 2 | 523 | PRICE | 12 |
| DIRECTION | 524 | ENUMERATED | 1 |
| VALUE_DATE 1 | 525 | DATE | 11 |
| VALUE_DATE 2 | 526 | DATE | 11 |
| VALUE_DATE 3 | 527 | DATE | 11 |
| VALUE_DATE 4 | 528 | DATE | 11 |
| PAYMENT_1 | 529 | ALPHANUMERIC | 56 |
| PAYMENT_2 | 530 | ALPHANUMERIC | 56 |
| PAYMENT_3 | 531 | ALPHANUMERIC | 56 |
| PAYMENT_4 | 532 | ALPHANUMERIC | 56 |

These unique field identifiers as they relate to deposit deals is shown below by way of example in Table C.

TABLE C

| Field List Name: | | DEPOSIT_DEAL | |
| Field List Number: | | 503 | |
| ACRONYM | FID | FIELD TYPE | LENGTH |
| --- | --- | --- | --- |
| SOURCE | 500 | ENUMERATED | 1 |
| REFERENCE | 501 | ALPHANUMERIC | 8 |
| DEAL_DATE | 502 | DATE | 11 |
| DEAL_TIME | 503 | TIME | 8 |
| DEALER_ID | 504 | ALPHANUMERIC | 6 |
| CONFIRM_DATE | 505 | DATE | 11 |
| CONFIRM_TIME | 506 | TIME | 8 |
| CONFIRM_ID | 507 | ALPHANUMERIC | 6 |
| BANK_CODE_1 | 508 | ALPHANUMERIC | 4 |
| BANK_NAME_1 | 509 | ALPHANUMERIC | 56 |
| BROKER_CODE | 510 | ALPHANUMERIC | 4 |
| BROKER_NAME | 511 | ALPHANUMERIC | 56 |
| BROKER_NAME_2 | 513 | ALPHANUMERIC | 56 |
| DEAL_TYPE | 514 | ENUMERATED | 1 |
| PERIOD_1 | 515 | ENUMERATED | 3 |
| PERIOD_2 | 516 | ENUMERATED | 3 |
| CURRENCY_1 | 517 | ALPHANUMERIC | 3 |
| VOLUME_1 | 519 | INTEGER | 15 |
| DEPOSIT_RATE | 520 | PRICE | 12 |
| VALUE_DATE_1 | 525 | DATE | 11 |
| VALUE_DATE_2 | 526 | DATE | 11 |
| PAYMENT_1 | 529 | ALPHANUMERIC | 56 |
| PAYMENT_2 | 531 | ALPHANUMERIC | 56 |

Preferably, requests for the status of the deal or trading ticket data base contained in the local data base server 416 of a particular terminal controller 400 will provide information to the back office computer 401 on the earliest and latest deal identifiers stored at the local data base server 416, with the date and time of the trading tickets. This information would permit the back office computer 401 to determine the range of trading tickets available for retrieval. An example of a Deal Status Field List is given below in Table D by way of example.

TABLE D

| Field List Name: | | DEAL_STATUS | |
| Field List Number: | | 500 | |
| ACRONYM | FID | FIELD TYPE | LENGTH |
| --- | --- | --- | --- |
| OLD_DEAL_ID | 533 | ALPHANUMERIC | 11 |
| OLD_DEAL_DATE | 534 | DATE | 11 |
| OLD_DEAL_TIME | 535 | TIME | 8 |
| NEW_DEAL_TIME | 536 | ALPHANUMERIC | 11 |
| NEW_DEAL_DATE | 537 | DATE | 11 |
| NEW_DEAL_TIME | 538 | TIME | 8 |

Preferably, all fields within the messages transmitted between the local data base server 416 and back office computer 401 contain ASCII characters which makes them suitable for display on a video terminal with little or no additional formatting, thus making the data feed of the present invention ideal for quick impletation in a data display system. In this regard, as illustrated in FIGS. 9-11, standard ASCII control characters are employed in the trading ticket requests and records of responses between the local data base server 416 and the back office computer 401. These control characters are FS, which represents the file separator character; GS, which represents the group separator character; RS, which represents the record separator character; and US, which represents the unit separator character. Preferably, the trading ticket protocol of the present invention uses file separators at each end to deliniate the beginning and end of an information message frame. As can be noted by reference to FIGS. 9-11, there is a field labeled "Tag". What this refers to is the unique identification assigned to each message by the back office computer 401 so that it can match the record response from the local data base server 416 with the request. Preferably in the trading ticket output protocol of the present invention all fields in a Field List must be present with a single space character being provided in the field if the information for a field is not available. In this manner, the presently preferred ticket output protocol of the present invention allows many fields to be empty.

With respect to the aforementioned deal data base status request, which is preferably in the form in the above example of AAAAA#INFO, a typical reply to such a request is illustrated in FIG. 12. With respect to the record shown by way of example in FIG. 12, the "Tag" reflects that of the request by the back office computer 401, as previously mentioned, and the Field ID and Field Value options can be, by way of example, the oldest deal identifier, the oldest deal date, the oldest deal time, the latest deal identifier, the latest deal date, and the latest deal time. Thus, as can be seen in the response of FIG. 12, as well as in the response of FIG. 10, each field identifier has associated with it a field value, with the field identifier being determined by the Field List or transmission template which is unique to the type of deal. However, it should be noted, that the requests by the back office computer 401 are not by type of deal but rather are by deal identifier irrespective or independant of the type of deal. It is when the requested record is retrieved from the local data base that the record response to the back office computer 401 contains the type of deal and it's associated information. Thus, the trading ticket requests by the back office computer 401 are transparent to the type of deal. In addition, by sending out a status request so that the back office computer 401 can update it's status record, a determination can be made that another trade has occured if there is a change in the status record and a request can then be made for any records which were not previously retrieved. Thus, if a specific trading ticket is requested, the data is preferably provided but not updated, since ticket data, which is a confirmation of a deal, cannot be changed. However, the status data can be retrieved for update and so a revised version of the status data is preferably supplied whenever the status changes. In this regard, the status data may be read as a snapshot request at intervals and then any new trading tickets retrieved if the status has changed; or it may be read with an update request and, when an update is received indicating that one or more new trading tickets is ready, the new trading ticket data from that terminal controller 400, 400a can then be retrieved. Preferably, the method of the present invention using the update is employed as it appears to provide a faster response.

Referring now to FIG. 11, a typical format for a data and updates request for a trading ticket to the data base server 416 from the back office computer 401 is shown. As was previously mentioned, the original "Tag" is returned to the back office computer 401 with the record response with the same "Tag" also preferably being sent along with subsequent updates. FIG. 9 illustrates a snapshot request which is similar to the data and updates request of FIG. 11 except that no updates are forwarded. In the ticket output protocol system of the present invention, snapshot requests, such as shown in FIG. 9, are preferably employed for requesting trading ticket data, whereas data and updates requests, such as illustrated in FIG. 11, are employed for requesting status data. FIG. 10 illustrates the record response from the local database server 416 to the back office computer 401 in response to a trading ticket request, such as the snapshot request of FIG. 9. Although only one Field ID and corresponding Field Value are illustrated in FIG. 10, it is clear that for any given Field List, such as in the examples of Tables A-C, each Field ID associated with a given Field List and it's associated Field Value, will be contained in the actual record response from the local data base server 419 to the back office computer 401 when a request for trading ticket data is made of the terminal controller 400. Once again, as previously mentioned, this request is made without any knowledge required or used on the part of the back office computer 401 as to the type of deal for which the information is going to be supplied since this information is contained in the response record and not in the request record.

Figure 4:
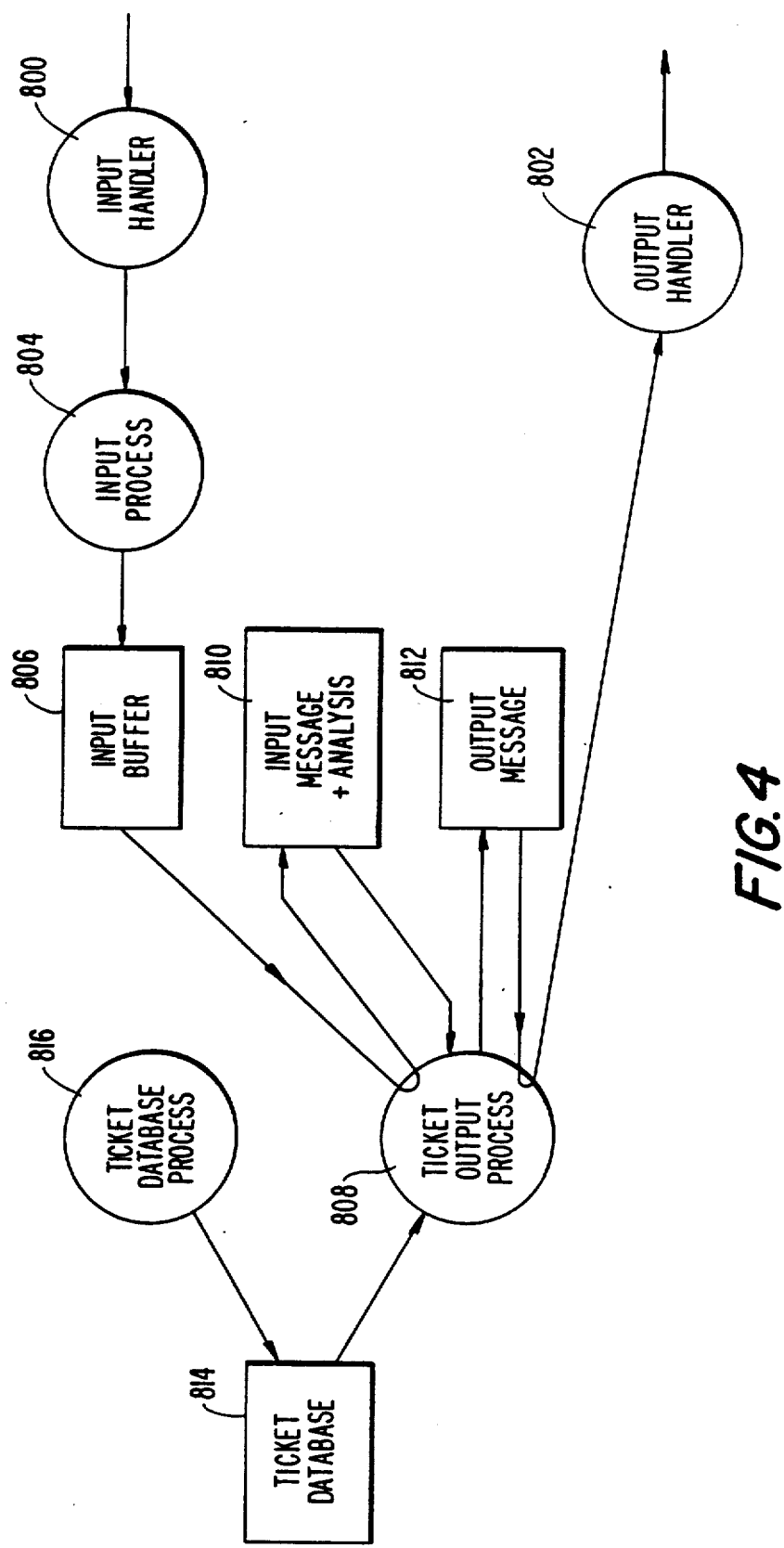
FIG. 4 is a diagrammatic illustration of a portion of the trading ticket output system of the present invention concerned with the ticket output protocol.

FIG. 4 diagrammatically illustrates the various portions of the trading ticket output system of the present invention concerned with the presently preferred trading ticket output protocol. Thus, a conventional serial line handler provided by the operating system is employed with, for convenience of explanation, the input and output being separately illustrated as the input handler 800 and the output handler 802. The input process 804 preferably extracts input bytes from the serial line via the input handler 800 and places them in an input buffer 806. The input buffer 806 performs the checks for input packets and checksums and can also set flags to ask the ticket output process 808 to generate the control characters ACKNOWLEDGE and NO ACKNOWLEDGE at appropriate points in the output stream. The input process 804 also preferably detects these control characters, such as ACKNOWLEDGE and NO ACKNOWLEDGE, at the appropriate points in the input stream, with the occurrence of these control characters being tested for by the ticket output process 808 when it has sent a message. The ticket output process 808 is preferably scheduled regularly and has several independent tasks, the main ones of which are preferably taking confirmed bytes from the input buffer 806 and placing them in a message buffer 810, scanning the message 810 to find the next complete message if available and, when found, checking the message. If the message is faulty, an appropriate error response is sent to the output message buffer 812. If, however, the message is valid, appropriate flags are set to request the required action. Preferably, no further messages are then handled by the ticket output process 808 until the action is complete. If a ticket or status report is requested by an input message, then the ticket output process 808 preferably gathers the data from the ticket data base 814 and places it in the defined format, determined by the Field List, in the output message buffer 812. When a message has been assembled in the output message buffer 812, the ticket output process 808 preferably adds the appropriate control bytes and transfers it to the output handler 802, passing as many characters as the output handler 802 can accept at a time until the whole message has been transferred to the back office computer 401 from the local data base server 416. The ticket data-base process 814 is preferably modified to support updates of the status data in the ticket output protocol. The addition is preferably required when the data base is modified by the addition of a new trading ticket or the removal of an old ticket. In these cases, the ticket data base process 816 preferably sets a flag so that the update will be created by the ticket output process 808, with the flag being cleared, as appropriate, by the ticket output process 808. The ticket data-base process 816 is preferably designed so that it adds a ticket to the end of the data base 814 and obtains space as necessary by removing the earliest tickets from the beginning of the data base 814. Either of those changes alters the status of the data base 814 so that when there is a status check by the back office computer 401, the back office computer 401 is, thus, advised of the addition of a trading ticket by detecting the change in status. This is indicated to the ticket output process 808 by setting out a flag which is cleared, when appropriate, by the ticket output process 808.

Figure 5:
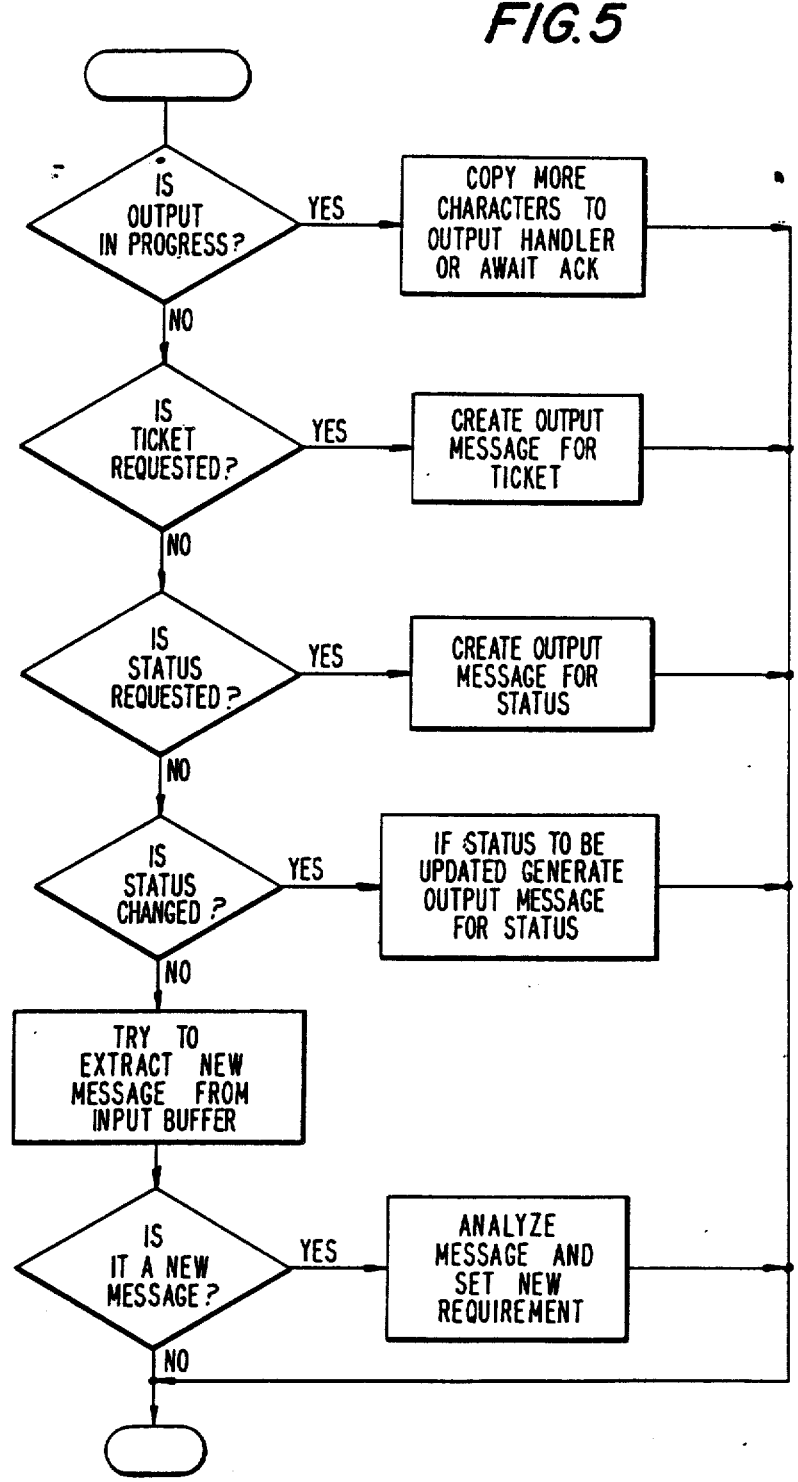
FIG. 5 is a diagrammatic flow chart of the presently preferred ticket output process in accordance with the trading ticket output system of the present invention.

FIG. 5 further illustrates the presently preferred operation of the ticket output process 808 which, as can be seen, is entered at frequent intervals. The logic preferably gives priority to responses to requests, and handles one request at a time. A request preferably remains in the input message and analysis stage 810 until it has been answered. When any message has been created for output, preferably the ticket output process 808 is dedicated to the output of the message until it has been ACKNOWLEDGED or has been transmitted a given number of times without acknowledgment. Preferably, when no message is being output, the ticket output process 808 checks to see if an input message has requested a trading ticket. If so, the trading ticket is retrieved, a message is created according to the type of ticket by use of the Field List, and the new message is marked for output to the back office computer 401. When no ticket is being requested, the ticket output process 808 preferably checks if the status record has been requested. If so, the status data is preferably obtained and the status record is set up for output in a similar way to the trading ticket output. If, however, no status is requested, then the ticket output process 808 preferably checks to see if the status has been marked as changed by the ticket data base process 816. If a change is detected, the flag indicating the change is preferably cleared. The logic then preferably checks if the status record is currently requested in an updating mode. If this has occured, the new status is preferably output on the line and the ticket output process 808 creates a new status in the output message buffer 812 and then arranges that it will output the message. In the aforementioned implementation, the status record is preferably updated by retransmission of the whole status record. If none of the above conditions exist, the ticket output process 808 then preferably tries to find a complete new input message. If this succeeds, the ticket output process 808 preferably analyzes the input message. A valid message causes a change in the analysis data. The analysis of a valid message requesting data sets flags which then cause the ticket output process 808 to generate the requested output as it is rescheduled repeatedly. Other valid messages just change the current state of the analysis data, whereas invalid messages cause the ticket output process 808 to generate an appropriate error response. The above described procedure is illustrated in the flow diagram of FIG. 5.

Figure 6:
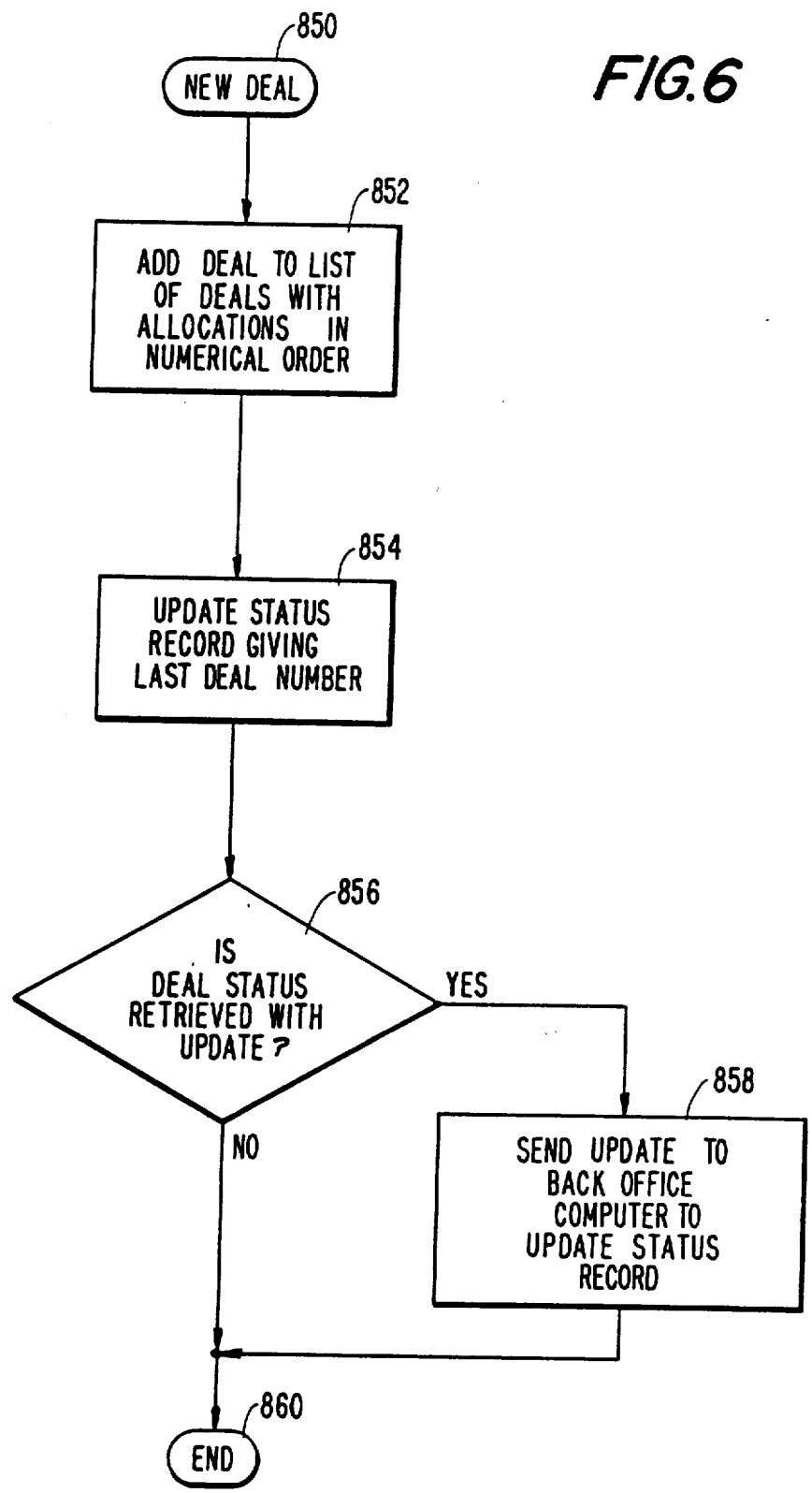
FIG. 6 is a diagrammatic flow chart of the operation of the terminal controller when a new trading ticket has been generated in accordance with the trading ticket output system of the present invention.
Figure 7:
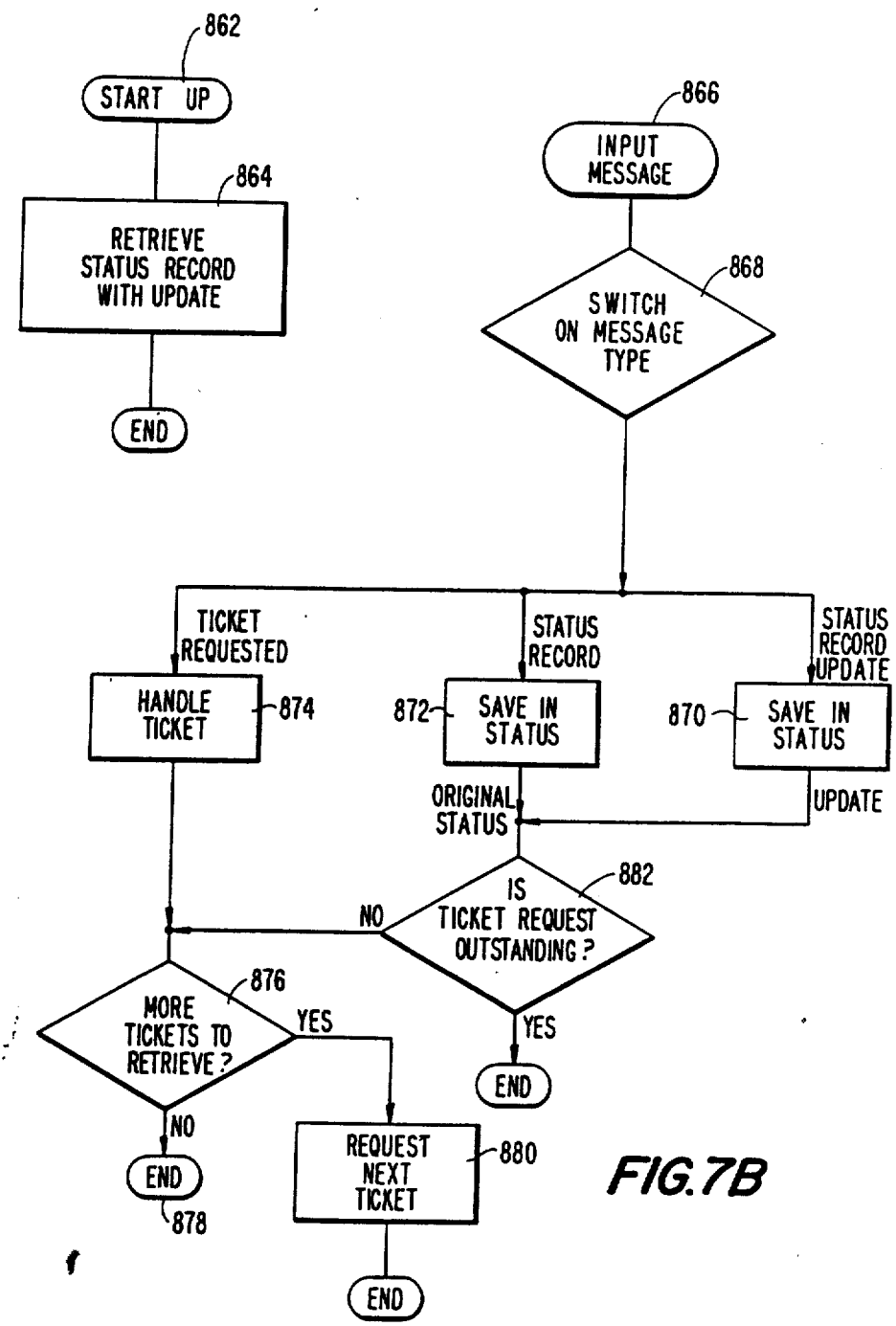
FIGS. 7A and 7B are diagrammatic flow charts of the operation of the back office computer in connection with the use of status records in accordance with the present invention in order to avoid the need for continuous polling.

Referring now to FIG. 6, the operation of the terminal controller 400 data base when a new trading ticket has been generated in accordance with the trading ticket output system of the present invention is shown. Thus, when a new deal is generated, as represented by reference numeral 850, the trading ticket corresponding to the deal is added to the list of deals with allocations of the deals or tickets being in numerical order as was previously described, such as represented by reference numeral 852. The status record is then updated, giving the last deal number, as represented by reference numeral 854, and a determination is made as to whether the deal status is being retrieved with an update, as represented by reference numeral 856. If the deal status is being retrieved with an update, the update is sent to the back office computer 401 to update the status record, such as represented by reference numeral 858, and if it is not, then the routine ends, as represented by refererence numeral 860.

Referring now to FIGS. 7A and 7B, the operation of the back office computer 401, in connection with the use of status records, in accordance with the present invention, is illustrated. Thus, on startup, as represented by reference numeral 862, there is a retrieval of the status record with updates, as represented by reference numeral 864. The input message following the initial retrieval of the status record, as represented by reference numeral 866, causes a switch on the message type, as represented by reference numeral 868. Subsequent updates to the status record and requests for the next ticket are treated as subsequent input messages Thus, as can be seen in FIG. 7B, the switch on message type is between the ticket requested, the status record, and the status record update, with the status record update being saved in status, as represented by reference numeral 870, as is also true for the status record, as represented by reference numeral 872. The ticket requested message, however, leads to the handling of the ticket, as represented by reference numeral 874, and a determination of whether there are more tickets to retrieve, as represented by reference numeral 876. If there are no more tickets to retrieve, then the procedure ends, as represented by reference numeral 878. If, however, there are more tickets to retrieve, then the next ticket is requested, as represented by reference numeral 880. With respect to the status record, in both instances of the status record or the status record update, there is a determination made as to whether there is a ticket request outstanding, as represented by reference numeral 882. If there is not, then a determination is made as to whether or not there are more tickets to retrieve, as represented by reference numeral 876. However, if there is a ticket request outstanding, then this routine ends.

Figure 8:
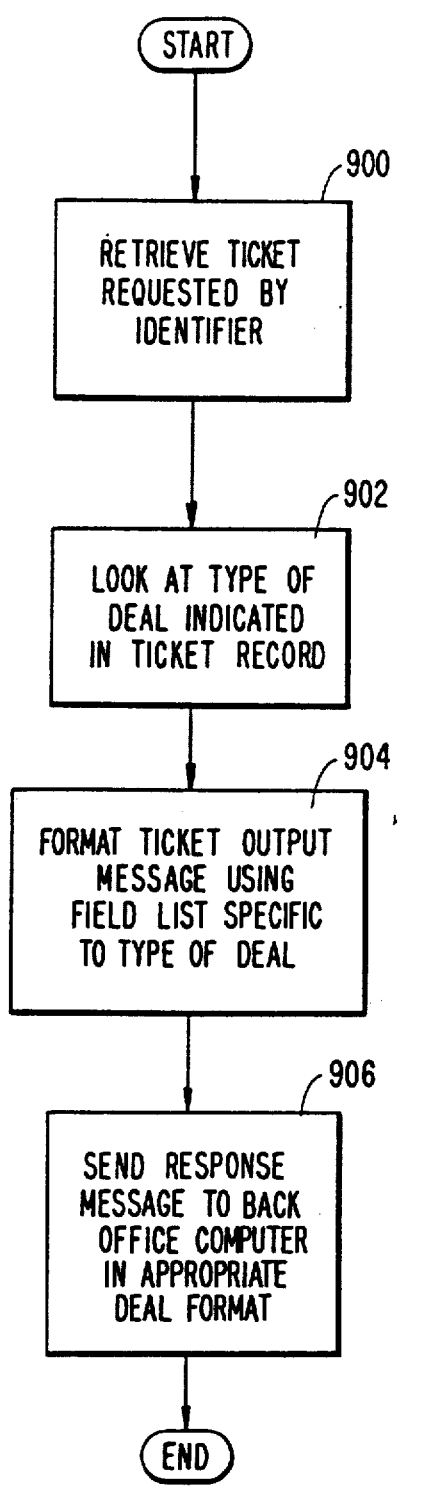
FIG. 8 is a diagrammatic flow chart of the operation of the data base server with respect to requests for tickets received by the data base server from the back office computer.

Referring now to FIG. 8, a flow chart is shown of the operation of the local data base server 416, with respect to requests for tickets received by the local data base server 416 from the back office computer 401. Thus, the trading ticket requested by the back office computer 401, is requested by Deal Identifier, which, as previously mentioned, does not specify the type of deal. This is represented by reference numeral 900. The type of deal indicated is then looked at in the ticket record being retrieved, as represented by reference numeral 902, and the ticket output message is then formatted using the Field List specific to the type of deal, as represented by reference numeral 904 in FIG. 8. The formatted record response message, which now contains information as to the type of deal, as well as the various parameters and values associated with them, is then sent to the back office computer 401 in the appropriate deal format, based on the Field List contained in the retrieved record and, for the first time, the back office computer 401 finds out what type of deal was involved with the request. This is represented by reference numeral 906. It should be noted, as previously mentioned, the request by the back office computer 401 and the response to the back office computer from the local database server 416, contain a "Tag" which identifies the particular request being made.

Thus, by employing the trading ticket output protocol system of the present invention, high-speed reliable transfer of trading ticket information, without continual polling, can be provided between one or more local data base servers, associated with a group of terminal controllers, and a back office computer.

What is claimed is:

1. A trading ticket output communication system for randomly communicating trading ticket output information relating to a plurality of different trading transactions, from a plurality of local data bases at which said trading ticket output information is initially collected, to a remote back office data base operatively connected to said plurality of local data bases, said system comprising means for providing said trading ticket output information corresponding to at least one of said trading transactions to said remote back office data base from a given one of said plurality of local data bases, said given one of said local data bases comprising means for initially collecting said trading ticket output information corresponding to said at least one of said plurality of trading transactions, for confirming said collected one of said trading transactions, and for storing each one of said confirmed trading transactions as a unique trading ticket record having an associated sequential deal number corresponding to an order of entry of said each one of said stored trading transactions at said local data base, each of said plurality of local data bases further comprising means for retrievably storing a dynamic trading ticket status record at said local data base comprising the latest associated sequential deal number stored at said local data base and for updating said stored latest associated sequential deal number in response to said storing of said unique trading ticket record at said local data base; said local data base further comprising means for providing a status update message to said remote back office data base in response to said updating of said stored latest associated sequential deal number at said local data base; and said remote back office data base comprising means for storing said plurality of different trading transactions confirmed by said plurality of local data bases as a corresponding plurality of said unique trading ticket records having said associated sequential deal numbers and further comprising means for storing a central dynamic trading ticket status record comprising the latest of said associated sequential deal numbers stored at said plurality of local data bases at said remote back office data base and for updating said stored latest of said associated sequential deal numbers in response to receipt of said status update message from said local data base for advising said remote back office data base of an addition of a trading ticket record to said system; whereby said remote back office data base may be randomly advised of the occurrence of additional trading transactions in said system by detecting a change in status of said trading ticket status record without continual polling of said plurality of local data bases.

2. A trading ticket output communication system in accordance with claim 1 wherein said remote back office data base further comprises means for requesting said status record from said local data base in the format <FS> DUR <US> <TAG> <GS> <Alpha Name> <FS> where FS, GS and US are ASCII control characters for file separator, group separator and unit separator, respectively, Tag is a unique identifier denoting the request number from the remote back office data base, and DUR is a unique identifier that denotes a status request from said remote back office data base as a data and updates request, said local data base providing said status update message in response to said request from said remote back office data base.

3. A trading ticket output communication system in accordance with claim 2 wherein each of said local data bases has an associated unique identifier, said stored unique trading ticket record at said given local data base further comprising said unique local data base identifier associated therewith.

4. A trading ticket output communication system in accordance with claim 3 wherein each of said plurality of said local data bases has a different associated unique local data base identifier, said sequential deal number corresponding to said confirmation at a given one of said local data bases, each of said local data bases retrievably storing said status record corresponding to said local data base.

5. A trading ticket output communication system in accordance with claim 1 wherein said remote back office data base further comprises means for requesting a ticket record from said given local data base, said given local data base comprising means for providing said requested ticket record response in the format <FS> RR <US> <TAG> <GS> <Alpha Name> <US>

<Field List No.> <US> <RTL> 1 {<RS> <Field ID>

<US> <Field Value>} n <FS> where FS, GS, US and RS are ASCII control characters for file separator, group separator, record separator and unit separator, respectively, RR is a unique identifier that denotes a transmission from said given local data base as a record response, Tag is a unique identifier denoting the request number from the remote back office data base, and RTL denotes a record transaction level number corresponding to the number of updates of said record.

6. A trading ticket output communication system in accordance with claim 5 wherein the request from said remote back office data base comprises a snapshot request in the format

```
<FS> SR <US> <Tag> <GS> <Alpha
    Name> <FS>
```
where SR is a unique identifier that denotes a request from said remote back office data base as a snapshot request.

7. A trading ticket output communication system in accordance with claim 1 wherein said remote back office data base, further comprises means for initiating a snapshot request in the format

```
<FS> SR <US> <Tag> <GS> <Alpha
    Name> <FS>
```
where SR is a unique identifier that denotes a request from said remote back office data base as a snapshot request, FS, GS and US are ASCII control characters for file separator, group separator and unit separator, respectively, and Tag is a unique identifier denoting the request number from the remote back office data base.

8. A trading ticket output communication system in accordance with claim 1 wherein said trading transactions are money market financial transactions.

9. A trading ticket output communication system in accordance with claim 1 wherein said different trading transactions comprise different type trading transactions, said sequential deal number being independent of the type of trading transaction to which said trading ticket record corresponds.

10. A trading ticket output communication system in accordance with claim 1 wherein each of said local data bases has an associated unique identifier, said unique stored trading ticket record at said given local data base further comprising said unique local data base identifier associated therewith.

11. A trading ticket output communication system in accordance with claim 1 wherein said plurality of different trading transactions comprise different type trading transactions.

12. A trading ticket output communication system in accordance with claim 1 wherein said trading transactions are money market financial transactions.

13. A trading ticket output communication system in accordance with claim 1 wherein said plurality of different types of trading transactions comprise a single deal, a swap deal, and a deposit deal.

14. A trading ticket output communication system in accordance with claim 1 wherein said single deal comprises a spot deal and an outright deal.

* * * * *

UNITED STATES PATENT AND TRADEMARK OFFICE
CERTIFICATE OF CORRECTION

PATENT NO. : 5,003,473
DATED : March 26, 1991
INVENTOR(S) : J.M. RICHARDS It is certified that error appears in the above-identified patent and that said Letters Patent is hereby corrected as shown below:

Column 12, line 60: Change "NEW_DEAL_TIME  536" to --NEW_DEAL_ID  536--.

Column 18, line 17: Change "<TAG>" to --<Tag>--.

Column 18, line 49: Change "<TAG>" to --<Tag>--.

Column 20, line 15: In claim 12, change "claim 1" to --claim 11--.

Column 20, line 18: In claim 13, change "claim 1" to --claim 12--.

Column 20, line 22: In claim 14, change "claim 1" to --claim 13--.

Signed and Sealed this

Twenty-third Day of March, 1993

Attest:

STEPHEN G. KUNIN

*Attesting Officer*     Acting Commissioner of Patents and Trademarks